US010862557B2

(12) United States Patent
Liu (10) Patent No.: US 10,862,557 B2
(45) Date of Patent: Dec. 8, 2020

(54) DATA TRANSMISSION METHOD, SENDING DEVICE, AND RECEIVING DEVICE

(71) Applicant: HUAWEI TECHNOLOGIES CO., LTD., Shenzhen, Guangdong (CN)

(72) Inventor: Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 32 days.

(21) Appl. No.: 16/273,680

(22) Filed: Feb. 12, 2019

(65) Prior Publication Data

US 2019/0173541 A1 Jun. 6, 2019

Related U.S. Application Data

(63) Continuation of application No. PCT/CN2017/096665, filed on Aug. 9, 2017.

(30) Foreign Application Priority Data

Aug. 12, 2016 (CN) .......................... 2016 1 0666674

(51) Int. Cl.
*H04B 7/0456* (2017.01)
*H04L 1/00* (2006.01)
(Continued)

(52) U.S. Cl.
CPC ........... *H04B 7/0486* (2013.01); *H04B 7/063* (2013.01); *H04B 7/0632* (2013.01);
(Continued)

(58) Field of Classification Search
CPC .. H04B 7/0486; H04B 7/0632; H04B 7/0634; H04B 7/063–0634; H04L 1/0026; H04L 5/0005; H04L 5/0057
See application file for complete search history.

(56) References Cited

U.S. PATENT DOCUMENTS

| | | | |
|---|---|---|---|
| 8,675,794 B1 * | 3/2014 | Perets | H04W 72/0413 375/349 |
| 8,774,310 B2 * | 7/2014 | Khan | H04L 5/0053 375/296 |

(Continued)

FOREIGN PATENT DOCUMENTS

| | | |
|---|---|---|
| CN | 101577572 A | 11/2009 |
| CN | 102651677 A | 8/2012 |

(Continued)

OTHER PUBLICATIONS

"MIMO feedback signalling," TSG RAN WG1 meeting #51, Jeju, Republic of Korea, XP050108223, R1-074752, 3rd Generation Partnership Project—Valbonne, France (Nov. 5-9, 2007).

(Continued)

*Primary Examiner* — James M Perez
(74) *Attorney, Agent, or Firm* — Leydig, Voit & Mayer, Ltd.

(57) ABSTRACT

Embodiments of the present invention relate to the communications field, and provide a data transmission method, a sending device, and a receiving device. Transmission requirements of different subbands can be maximally satisfied, and a system throughput can be improved. The method includes: determining, by a sending device, rank indicators of J (an integer greater than or equal to 1) subbands corresponding to a to-be-transmitted channel, where the rank indicators of the J subbands are not totally the same; determining, by the sending device based on a rank indicator of each of the J subbands, a transmission block size.

18 Claims, 4 Drawing Sheets

(51) Int. Cl.
H04B 7/06 (2006.01)
H04L 5/00 (2006.01)

(52) U.S. Cl.
CPC ......... *H04B 7/0634* (2013.01); *H04L 1/0026* (2013.01); *H04L 5/0005* (2013.01); *H04L 5/0057* (2013.01)

(56) References Cited

U.S. PATENT DOCUMENTS

| | | | |
|---|---|---|---|
| 9,148,818 B2* | 9/2015 | Yue | H04B 7/0486 |
| 10,181,964 B2* | 1/2019 | Yum | H04L 25/0204 |
| 2009/0154588 A1* | 6/2009 | Chen | H04L 1/0026 |
| | | | 375/267 |
| 2009/0199055 A1* | 8/2009 | Chen | H03M 13/356 |
| | | | 714/701 |
| 2010/0091905 A1* | 4/2010 | Khan | H04L 5/0053 |
| | | | 375/296 |
| 2010/0118817 A1* | 5/2010 | Damnjanovic | H04B 7/0634 |
| | | | 370/329 |
| 2012/0003945 A1* | 1/2012 | Liu | H04L 1/0029 |
| | | | 455/115.1 |
| 2013/0039349 A1* | 2/2013 | Ebrahimi Tazeh Mahalleh | H04B 7/024 |
| | | | 370/336 |
| 2013/0058386 A1* | 3/2013 | Mazzarese | H04B 7/063 |
| | | | 375/219 |
| 2013/0121437 A1* | 5/2013 | Wang | H04B 7/0641 |
| | | | 375/295 |
| 2013/0182672 A1* | 7/2013 | Kakishima | H04L 5/0053 |
| | | | 370/329 |
| 2014/0044061 A1* | 2/2014 | Yue | H04B 7/063 |
| | | | 370/329 |
| 2016/0013918 A1* | 1/2016 | Zhang | H04L 1/0027 |
| | | | 370/329 |
| 2016/0323021 A1* | 11/2016 | Chen | H04B 7/0486 |
| 2017/0085303 A1* | 3/2017 | Chen | H04W 72/046 |
| 2019/0173541 A1* | 6/2019 | Liu | H04L 5/0005 |
| 2020/0022120 A1* | 1/2020 | Liu | H04W 72/042 |

FOREIGN PATENT DOCUMENTS

| | | |
|---|---|---|
| CN | 104184561 A | 12/2014 |
| CN | 104202073 A | 12/2014 |
| WO | 2015096423 A1 | 7/2015 |

OTHER PUBLICATIONS

International Search Report dated Oct. 27, 2017 in corresponding International Application No. PCT/CN2017/096665.
International Search Report dated Oct. 27, 2017 in corresponding International Patent Application No. PCT/CN2017/096665 (7 pages).
Written Opinion of the International Searching Authority dated Oct. 27, 2017 in corresponding International Patent Application No. PCT/CN2017/096665 (4 pages).

* cited by examiner

DATA TRANSMISSION METHOD, SENDING DEVICE, AND RECEIVING DEVICE

CROSS-REFERENCE TO RELATED APPLICATIONS

This application is a continuation of International Application No. PCT/CN2017/096665, filed on Aug. 9, 2017, which claims priority to Chinese Patent Application No. 201610666674.4, filed on Aug. 12, 2016, The disclosures of the aforementioned applications are hereby incorporated by reference in their entireties.

TECHNICAL FIELD

Embodiments of the present invention relate to the communications field, and in particular, to a data transmission method, a sending device, and a receiving device.

BACKGROUND

In a downlink system of the 3GPP (the 3rd Generation Partnership Project, the 3rd Generation Partnership Project) LTE (Long Term Evolution, Long Term Evolution) R10 (Release 10, Release 10), UE (User Equipment, user equipment) performs channel state information measurement by using a CSI-RS (Channel State Information-Reference Signal, channel state information-reference signal) and obtains channel state information CSI based on a measurement result. The CSI includes an RI (Rank Indicator, rank indicator), a PMI (Precoding Matrix Indication, precoding Indicator), a CQI (Channel Quality Indicator, channel quality indicator), and the like. The rank indicator reflects a quantity of space layers of a channel.

Currently, rank indicators in entire system bandwidth are the same. To be specific, subbands of the entire bandwidth have a common rank indicator. In addition, corresponding data transmission based on a common rank specifically includes: code-word-to-layer mapping, determining of a transmission block size, and link adaptation. As the system bandwidth dramatically increases, it is found after measurement on channel state information that distribution of ranks of the entire bandwidth presents subband characteristics. To be specific, different subbands may have different rank indicators. For example, a rank of a subband 1 is 1, a rank of a subband 2 is 3, and a rank of a subband 3 is 2. The subbands herein may be subbands different from subbands in an LTE CSI measurement feedback, such as large subbands corresponding to larger subband sizes. For example, one of the large subbands corresponds to 48 or 50 physical resource blocks.

Currently, in a high bandwidth scenario, a transmit end performs data transmission based on the common rank indicator of the entire bandwidth. Because the common rank indicator cannot satisfy requirements of different subbands, a data transmission effect is relatively poor, and system performance is greatly deteriorated.

SUMMARY

Embodiments of the present invention provide a data transmission method, a sending device, and a receiving device. In a high bandwidth scenario, data transmission based on different rank indicators of different subbands can maximally satisfy transmission requirements of different subbands, to improve a system throughput.

To achieve the foregoing objective, the following technical solutions are used in the embodiments of the present invention.

According to a first aspect, a data transmission method is disclosed. The data transmission method includes:

determining, by a sending device, rank indicators of J subbands corresponding to a to-be-transmitted channel, where the rank indicators of the J subbands are not totally the same, and J is an integer greater than or equal to 2; next, determining, based on a rank indicator of each of the J subbands, a transmission block size and a quantity of transmission layers that corresponds to the subband, where the transmission block size herein may be a total transmission block size corresponding to the J subbands or a transmission block size corresponding to each of the J subbands; then, mapping, for each of the J subbands based on the rank indicator of the subband, a transmission block corresponding to the subband to a transmission layer corresponding to the subband; and at last, mapping, by the sending device, data carried on the transmission layer corresponding to the subband to a time-frequency resource for transmission. The J subbands may be J subbands predefined based on system bandwidth. For example, there are different quantities of subbands in different system bandwidth. Usually, higher system bandwidth indicates greater J. Optionally, in another implementation, the J subbands may be J subbands notified by a base station by using higher layer signaling or physical layer control signaling. This is not limited herein.

In the data transmission method provided in the present invention, that the sending device no longer performs data transmission based on a common rank indicator includes that the sending device no longer determines, based on the common rank indicator, the transmission block size corresponding to each subband, but determines, based on the rank indicator of each subband, the transmission block size corresponding to the subband and maps, based on the rank indicator of the subband, the transmission block to the transmission layer corresponding to the subband. Quantities of transmission layers that correspond to the subbands herein are not totally the same. In this way, differential transmission processing is performed on the subbands based on the rank indicators not totally the same that are of the subbands, to maximally satisfy requirements of different subbands, thereby improving performance of data transmission in a high bandwidth scenario.

With reference to the first aspect, in a first possible implementation of the first aspect, the method further includes: further sending, by the sending device, first control information indication signaling, where the signaling is used to indicate at least one of rank information, precoding matrix information, and modulation and coding information, the rank information includes the rank indicator of each of the J subbands, the precoding matrix information includes precoding matrix information of each of the J subbands, and the modulation and coding information includes modulation and coding information of each of the J subbands. Specifically, the rank information may include the rank indicator, for example, a rank indicator index (Rank Indicator, RI). The precoding matrix information may include a precoding matrix indication, for example, a precoding matrix indication index (Precoding Matrix Indication, PMI). The modulation and coding information may include a modulation and coding scheme, for example, a modulation and coding scheme index (Modulation Coding Scheme, MCS).

In this way, a receiving device can receive the first control information indication signaling, to receive data from the sending device based on the rank indicator, the precoding matrix information, and the modulation and coding information of each subband that are carried in the signaling.

With reference to the first aspect, in a second possible implementation of the first aspect, the J subbands are M physical subbands corresponding to the to-be-transmitted channel. In this case, J is equal to M. The physical subbands herein are a plurality of subbands into which transmission bandwidth corresponding to the to-be-transmitted channel is pre-divided. Alternatively, the J subbands consist of at least one group of subbands having a same rank in M physical subbands, the group of subbands having the same rank are at least two physical subbands whose rank indicators are the same in the M physical subbands, and certainly, in this case, J is less than M. The M physical subbands may be M physical subbands predefined based on the system bandwidth. For example, there are different quantities of physical subbands in different system bandwidth. Usually, higher system bandwidth indicates greater M. Optionally, in another implementation, the M physical subbands may be M physical subbands notified by the base station by using higher layer signaling or physical layer control signaling. This is not limited herein.

A subband definition herein may be particular to the system bandwidth. To be specific, different system bandwidth has different subband definitions (such as subband sizes). A subband size in a 5G system may be much greater than a subband size in a CSI feedback in an LTE system. For example, when the system bandwidth is 100 M, optionally, M may be equal to 10, and a size of each physical subband is 10 M.

The sending device needs to send control signaling to the receiving device to indicate the rank indicator of each subband, the modulation and coding scheme corresponding to each subband, and the like. When the J subbands are the M physical subbands corresponding to the to-be-transmitted channel and M is relatively great, overheads of signaling required by notifying the foregoing information of each subband are extremely great. Because the subbands having the same rank correspond to a same quantity of transmission layers, same processing may be performed on the subbands having the same rank: determining a modulation and coding scheme, determining a transmission block size, and the like. In this way, the subbands having the same rank are divided into a same virtual subband for same processing, so that overheads of required notification signaling can be greatly reduced.

With reference to the first aspect or the second possible implementation of the first aspect, in a third possible implementation of the first aspect, the determining, by the sending device based on a rank indicator of each of the J subbands, a transmission block size and a quantity of transmission layers that corresponds to the subband includes: first, using a rank indicator of the $i^{th}$ is an integer greater than or equal to 1 and less than or equal to J) subband in the J subbands as a quantity of transmission layers that corresponds to the $i^{th}$ subband; and determining, based on the rank indicator of the $i^{th}$ subband, a CQI corresponding to the $i^{th}$ subband, and determining, based on the CQI corresponding to the $i^{th}$ subband, modulation and coding information corresponding to the $i^{th}$ subband. In addition, a transmission block size corresponding to the $i^{th}$ subband is determined based on the quantity of transmission layers that corresponds to the $i^{th}$ subband, the modulation and coding information corresponding to the $i^{th}$ subband, and a quantity of scheduling resource blocks that corresponds to the $i^{th}$ subband.

Some channel state information, such as the precoding matrix information PMI and the channel quality indicator CQI, of the subband needs to be determined based on the rank indicator. Therefore, once the rank indicator of the subband is determined, the transmission layer and the transmission block size of the subband can be determined based on the rank indicator of the subband. The transmission block size herein is a size of the transmission block corresponding to each subband.

With reference to any one of the first aspect or the first to the third possible implementations of the first aspect, in a fourth possible implementation of the first aspect, the determining, by the sending device based on a rank indicator of each of the J subbands, a transmission block size and a quantity of transmission layers that corresponds to the subband includes: using the rank indicator of the $i^{th}$ subband in the J subbands as the quantity of transmission layers that corresponds to the $i^{th}$ subband, where i is an integer greater than or equal to 1 and less than or equal to J; and determining, based on the transmission block size corresponding to each of the J subbands, the transmission block size corresponding to the J subbands. For example, the transmission block size corresponding to the J subbands may be a sum of the transmission block sizes corresponding to the subbands.

Similarly, once the rank indicator of the subband is determined, the transmission layer and the transmission block size of the subband can be determined based on the rank indicator of the subband. The transmission block size herein is a total transmission block size of the J subbands.

With reference to the third or the fourth possible implementation of the first aspect, in a fifth possible implementation of the first aspect, the mapping, by the sending device based on the rank indicator of each of the J subbands, a transmission block corresponding to the subband to a transmission layer corresponding to the subband includes: mapping, based on the quantity of transmission layers that corresponds to the $i^{th}$ subband and a common quantity of code words of the J subbands, a code word corresponding to a transmission block corresponding to the $i^{th}$ subband to a transmission layer corresponding to the subband, where the common quantity of code words herein is the common quantity of code words of the J subbands, to be specific, the subbands share a same quantity of code words; or mapping, based on the quantity of transmission layers that corresponds to the $i^{th}$ subband and a quantity of code words of the $i^{th}$ subband, a code word corresponding to a transmission block corresponding to the $i^{th}$ subband to a transmission layer corresponding to the $i^{th}$ subband, where in this case, quantities of code words of the J subbands are not totally the same.

In this way, the sending device may map the transmission block of the subband to the transmission layer based on the rank indicator of the subband, to subsequently add data to different transmission layers for transmission.

With reference to any one of the first aspect or the second to the fifth possible implementations of the first aspect, in a sixth possible implementation of the first aspect, the mapping data carried on the transmission layer corresponding to the subband to a time-frequency resource for transmission includes: mapping, in an order of first frequency domain and then time domain, the data carried on the transmission layer corresponding to the subband. Certainly, alternatively, the data carried on the transmission layer may be mapped to the time-frequency resource in an order of first time domain and then frequency domain. Alternatively, the data may be mapped in any other mapping manner. This is not specifically limited herein.

In this way, the sending device can perform time-frequency mapping on data carried on different transmission layers, and the receiving device receives the sent data on corresponding time-frequency resources.

With reference to the first possible implementation of the first aspect, in a seventh possible implementation of the first aspect, the rank indicators of the J subbands in the first control information indication signaling use a differential manner; and/or the precoding matrix information of the J subbands uses a differential manner; and/or the modulation and coding information of the J subbands uses a differential manner.

With reference to the first possible implementation of the first aspect, in an eighth possible implementation of the first aspect, the sending device sends second control information indication signaling, where the second control information indication signaling is used to indicate at least one of a common rank indicator of the J subbands, the precoding matrix information of the J subbands, and common modulation and coding information of the J subbands. The precoding matrix information of the J subbands may be common precoding matrix information of the J subbands or may be the precoding matrix information of each of the J subbands.

Optionally, in another possible implementation, the second control information indication signaling is used to indicate at least one of a common rank indicator of K subbands, precoding matrix information of the K subbands, and common modulation and coding information of the K subbands. K is a positive integer less than or equal to M. When K is less than M, the K subbands share common rank information, common precoding matrix information, and the common modulation and coding information, thereby reducing feedback overheads of control signaling. Rank information, precoding matrix information, and modulation and coding information of remaining M-K subbands are sent to the receiving device by using the first control information indication signaling.

Herein, to reduce overheads of the indication signaling, all the subbands share one piece of modulation and coding information and one rank indicator.

With reference to the first aspect, in a ninth possible implementation of the first aspect, the determining, by a sending device, rank indicators of J subbands corresponding to a to-be-transmitted channel includes: determining, by the sending device based on channel quality measurement on a received reference signal, the rank indicators of the J subbands corresponding to the to-be-transmitted channel; or receiving the rank indicators reported by a device that are of the J subbands corresponding to the to-be-transmitted channel.

In this way, the sending device can obtain the rank indicators of the subbands, to determine the quantities of transmission layers, the transmission block sizes, and the like of the subbands based on the rank indicators of the subbands.

According to a second aspect, a data transmission method is disclosed. The data transmission method includes: receiving, by a receiving device, a reference signal sent by a sending device and performing channel quality measurement on a to-be-transmitted channel based on the reference signal to determine, based on a result of the channel quality measurement, rank indicators of J subbands corresponding to to-be-transmitted channel, where the rank indicators of the J subbands herein are not totally the same, and J is an integer greater than or equal to 2; and at last, reporting, to the sending device, the rank indicators of the J subbands that are determined in the previous step.

Optionally, the receiving device may report the rank indicators of the J subbands by using a physical uplink control channel (Physical Uplink Control Channel, PUCCH) or a physical uplink shared channel (Physical Uplink Shared Channel, PUSCH). This is not limited herein.

In addition, when the rank indicators of the subbands are different, correspondingly, precoding matrix indications of the subbands and channel quality indicators of the subbands are also different. The receiving device can obtain both the precoding matrix indications of the subbands and/or the channel quality indicators of the subbands based on the result of the channel quality measurement and report the indications and the indicators to the sending device.

Optionally, the rank indicators of the subbands may be jointly encoded with the precoding matrix indications and/or the channel quality indicators of the subbands, or each of the indications and indicators of the subbands may be independently encoded. This is not limited herein.

In the data transmission method provided in the present invention, the subbands no longer use a common rank indicator, and the rank indicators of the subbands are not totally the same. Further, quantities of transmission layers that correspond to the subbands are not totally the same. In this way, data transmission based on rank indicators not totally the same that are of the subbands can satisfy maximum performance requirements of different subbands, to improve a data transmission effect.

With reference to the second aspect, in a first possible implementation of the second aspect, the method further includes: receiving first control information indication signaling sent by the sending device, where the indication signaling is used to indicate at least one of rank information, precoding matrix information, and modulation and coding information, the rank information includes a rank indicator of each of the J subbands, the precoding matrix information includes precoding matrix information of each of the J subbands, and the modulation and coding information includes modulation and coding information of each of the J subbands; and the rank indicators of the J subbands use a differential manner; and/or the precoding matrix information of the J subbands uses a differential manner; and/or the modulation and coding information of the J subbands uses a differential manner.

Optionally, that the rank indicators of the J subbands use a differential manner means that a rank indicator of a subband in the J subbands is used as a reference rank indicator, and a report value of a rank indicator of another subband is a difference between the rank indicator of the another subband and the reference rank indicator. That the precoding matrix information of the J subbands uses a differential manner and/or that the modulation and coding information of the J subbands uses a differential manner have/has similar definitions.

The sending device may indicate a subband index value of at least one of a reference rank indicator, reference precoding matrix information, and reference modulation and coding information by using higher layer signaling or physical layer control signaling.

With reference to the second aspect, in a second possible implementation of the second aspect, the method further includes:

receiving second control information indication signaling sent by the sending device, where the indication signaling is used to indicate at least one of a common rank indicator of the J subbands, precoding matrix information of the J subbands, and common modulation and coding information of the J subbands. The precoding matrix information of the J subbands may be common precoding matrix information of the J subbands or may be precoding matrix information of each of the J subbands. Specifically, the rank information may include the rank indicator, for example, a rank indicator index (Rank Indicator, RI). The precoding matrix information may include a precoding matrix indication, for example, a precoding matrix indication index (Precoding Matrix Indication, PMI). The modulation and coding information may include a modulation and coding scheme, for example, a modulation and coding scheme index (Modulation Coding Scheme, MCS).

Optionally, in another possible implementation, the second control information indication signaling is used to indicate at least one of a common rank indicator of K subbands, precoding matrix information of the K subbands, and common modulation and coding information of the K subbands. K is a positive integer less than or equal to M. When K is less than M, the K subbands share common rank information, common precoding matrix information, and the common modulation and coding information, thereby reducing feedback overheads of control signaling. Rank information, precoding matrix information, and modulation and coding information of remaining M-K subbands are sent to the receiving device by using the first control information indication signaling.

With reference to the first or the second possible implementation of the second aspect, the method further includes: determining a transmission layer of each of the J subbands based on the rank indicator of each of the J subbands; determining, based on the rank indicator of each of the J subbands, a time-frequency resource to which the transmission layer corresponding to the subband is mapped; and obtaining, on the time-frequency resource to which the transmission layer corresponding to the subband is mapped, data transmitted by the sending device. "The rank indicator of each of the J subbands" herein may be the rank indicator of each subband that is indicated by the first control information indication signaling or may be the common rank indicator of the J subbands that is indicated by the second control information indication signaling.

According to a third aspect, a sending device is disclosed. The sending device includes:

a determining unit, configured to determine rank indicators of J subbands corresponding to a to-be-transmitted channel, where the rank indicators of the J subbands are not totally the same, and J is an integer greater than or equal to 2; where the determining unit is further configured to determine, based on a rank indicator of each of the J subbands, a transmission block size and a quantity of transmission layers that corresponds to each of the J subbands, where the transmission block size is a transmission block size corresponding to the J subbands or a transmission block size corresponding to each of the J subbands; a mapping unit, configured to map, based on the rank indicator of each of the J subbands, a transmission block corresponding to the subband to a transmission layer corresponding to the subband; and a transmission unit, configured to map data carried on the transmission layer corresponding to the subband to a time-frequency resource for transmission.

With reference to the third aspect, in a first possible implementation of the third aspect, the transmission device is further configured to send first control information indication signaling, where the first control information indication signaling is used to indicate at least one of rank information, precoding matrix information, and modulation and coding information. The rank information includes the rank indicator of each of the J subbands, the precoding matrix information includes precoding matrix information of each of the J subbands, and the modulation and coding information includes modulation and coding information of each of the J subbands.

With reference to the third aspect, in a second possible implementation of the third aspect, the J subbands are M physical subbands corresponding to the to-be-transmitted channel, and J is equal to M. Alternatively, the J subbands consist of at least one group of subbands having a same rank in the M physical subbands, the group of subbands having the same rank are at least two physical subbands whose rank indicators are the same in the M physical subbands, and J is less than M.

With reference to the first or the second possible implementation of the third aspect, in a third possible implementation of the third aspect, the determining unit is specifically configured to: use a rank indicator of an $i^{th}$ subband in the J subbands as a quantity of transmission layers that corresponds to the $i^{th}$ subband, where i is an integer greater than or equal to 1 and less than or equal to J; determine, based on the rank indicator of the $i^{th}$ subband, a channel quality indicator CQI corresponding to the $i^{th}$ subband, and determine, based on the CQI corresponding to the $i^{th}$ subband, modulation and coding information corresponding to the $i^{th}$ subband; and determine, based on the quantity of transmission layers that corresponds to the $i^{th}$ subband, the modulation and coding information corresponding to the $i^{th}$ subband, and a quantity of scheduling resource blocks that corresponds to the $i^{th}$ subband, a transmission block size corresponding to the $i^{th}$ subband.

With reference to any one of the third aspect or the first to the third possible implementations of the third aspect, in a fourth possible implementation of the third aspect, the determining unit is specifically configured to: use the rank indicator of the $i^{th}$ subband in the J subbands as the quantity of transmission layers that corresponds to the $i^{th}$ subband, where i is an integer greater than or equal to 1 and less than or equal to J; and determine, based on the transmission block size corresponding to each of the J subbands, the transmission block size corresponding to the J subbands.

With reference to the third or the fourth possible implementation of the third aspect, in a fifth possible implementation of the third aspect, the mapping unit is specifically configured to: map, based on the quantity of transmission layers that corresponds to the $i^{th}$ subband and a common quantity of code words of the J subbands, a code word corresponding to a transmission block corresponding to the $i^{th}$ subband to a transmission layer corresponding to the $i^{th}$ subband, where the common quantity of code words is the common quantity of code words of the J subbands; or map, based on the quantity of transmission layers that corresponds to the $i^{th}$ subband and a quantity of code words of the $i^{th}$ subband, a code word corresponding to a transmission block corresponding to the $i^{th}$ subband to a transmission layer corresponding to the $i^{th}$ subband, where quantities of code words of the J subbands are not totally the same.

With reference to any one of the third aspect or the first to the fifth possible implementations of the third aspect, in a sixth possible implementation of the third aspect, the transmission unit is specifically configured to map, in an order of first frequency domain and then time domain, the data carried on the transmission layer corresponding to the subband.

With reference to the first possible implementation of the third aspect, in a seventh possible implementation of the third aspect, the rank indicators of the J subbands in the first control information indication signaling use a differential manner; and/or the precoding matrix information of the J subbands uses a differential manner; and/or the modulation and coding information of the J subbands uses a differential manner.

With reference to the third aspect or the first possible implementation of the third aspect, in an eighth possible implementation of the third aspect, the transmission unit is further configured to send second control information indication signaling, where the second control information indication signaling is used to indicate at least one of a common rank indicator of the J subbands, the precoding matrix information of the J subbands, and common modulation and coding information of the J subbands.

The precoding matrix information of the J subbands may be common precoding matrix information of the J subbands or may be the precoding matrix information of each of the J subbands. Specifically, the rank information may include the rank indicator, for example, a rank indicator index (Rank Indicator, RI). The precoding matrix information may include a precoding matrix indication, for example, a precoding matrix indication index (Precoding Matrix Indication, PMI). The modulation and coding information may include a modulation and coding scheme, for example, a modulation and coding scheme index (Modulation Coding Scheme, MCS).

Optionally, in another possible implementation, the second control information indication signaling is used to indicate at least one of a common rank indicator of K subbands, precoding matrix information of the K subbands, and common modulation and coding information of the K subbands. K is a positive integer less than or equal to M. When K is less than M, the K subbands share common rank information, common precoding matrix information, and the common modulation and coding information, thereby reducing feedback overheads of control signaling. Rank information, precoding matrix information, and modulation and coding information of remaining M-K subbands are sent to the receiving device by using the first control information indication signaling.

With reference to the third aspect, in a ninth possible implementation of the third aspect, the determining unit is configured to determine, based on channel quality measurement on a received reference signal, the rank indicators of the J subbands corresponding to the to-be-transmitted channel; or the receiving unit is configured to receive the rank indicators reported by a device that are of the J subbands corresponding to the to-be-transmitted channel.

According to a fourth aspect, a receiving device is disclosed. The receiving device includes: a receiving unit, configured to receive a reference signal sent by a sending device; a measurement unit, configured to perform channel quality measurement on a to-be-transmitted channel based on the reference signal; a determining unit, configured to determine, based on a result of the channel quality measurement, rank indicators of J subbands corresponding to the to-be-transmitted channel, where the rank indicators of the J subbands are not totally the same, and J is an integer greater than or equal to 2; and a sending unit, configured to report the rank indicators of the J subbands to the sending device.

With reference to the fourth aspect, in a first possible implementation of the fourth aspect, the receiving unit is further configured to receive first control information indication signaling sent by the sending device, where the first control information indication signaling is used to indicate at least one of rank information, precoding matrix information, and modulation and coding information. The rank information includes a rank indicator of each of the J subbands, the precoding matrix information includes precoding matrix information of each of the J subbands, and the modulation and coding information includes modulation and coding information of each of the J subbands. The rank indicators of the J subbands use a differential manner; and/or the precoding matrix information of the J subbands uses a differential manner; and/or the modulation and coding information of the J subbands uses a differential manner.

With reference to the fourth aspect, in a second possible implementation of the fourth aspect, the receiving unit is further configured to receive second control information indication signaling sent by the sending device, where the second control information indication signaling is used to indicate at least one of a common rank indicator of the J subbands, precoding matrix information of the J subbands, and common modulation and coding information of the J subbands. The precoding matrix information of the J subbands may be common precoding matrix information of the J subbands or may be precoding matrix information of each of the J subbands. Specifically, the rank information may include the rank indicator, for example, a rank indicator index (Rank Indicator, RI). The precoding matrix information may include a precoding matrix indication, for example, a precoding matrix indication index (Precoding Matrix Indication, PMI). The modulation and coding information may include a modulation and coding scheme, for example, a modulation and coding scheme index (Modulation Coding Scheme, MCS).

Optionally, in another possible implementation, the second control information indication signaling is used to indicate at least one of a common rank indicator of K subbands, precoding matrix information of the K subbands, and common modulation and coding information of the K subbands. K is a positive integer less than or equal to M. When K is less than M, the K subbands share common rank information, common precoding matrix information, and the common modulation and coding information, thereby reducing feedback overheads of control signaling. Rank information, precoding matrix information, and modulation and coding information of remaining M-K subbands are sent to the receiving device by using the first control information indication signaling.

With reference to the first or the second possible implementation of the fourth aspect, in a third possible implementation of the fourth aspect, the determining unit is further configured to determine, based on the rank indicator of each of the J subbands, a transmission layer of each of the J subbands; and determine, based on the rank indicator of each of the J subbands, a time-frequency resource to which the transmission layer corresponding to the subband is mapped. The receiving unit is specifically configured to obtain, on the time-frequency resource to which the transmission layer corresponding to the subband is mapped, data transmitted by the sending device.

According to a fifth aspect, a sending device is disclosed. The sending device includes a processor, a transceiver, and a memory. The memory stores a group of code, and the processor calls the code in the memory to execute the first aspect of the embodiments of the present invention.

According to a sixth aspect, a receiving device is disclosed. The receiving device includes a processor, a transceiver, and a memory. The memory stores a group of code, and the processor calls the code in the memory to perform the method provided in the second aspect of the embodiments of the present invention.

DESCRIPTION OF EMBODIMENTS

Figure 1:
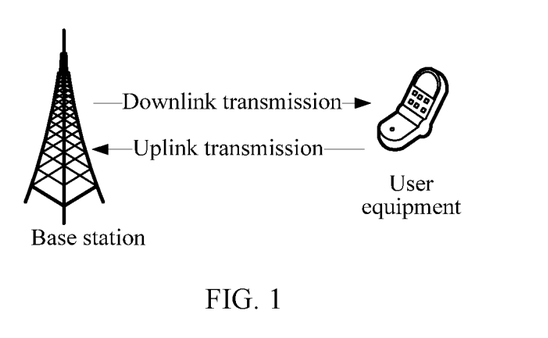
FIG. 1 is an architectural diagram of a communications system according to an embodiment of the present invention.

In a communications system shown in FIG. 1, a base station and UE (User Equipment, user equipment) perform channel sounding or signal demodulation by using a reference signal, to perform data transmission. Usually, a signal sent by the base station to the UE is referred to as a downlink signal, and data sent by the UE to the base station is referred to as an uplink signal. Common reference signal in communication between the base station and the UE include the following two types: one type of reference signal is used to perform coherent demodulation on a received signal including control information or data, and for example, is a DMRS (Demodulation Reference Signal, demodulation reference signal) in a 3GPP (the $3^{rd}$ Generation Partnership Project, the $3^{rd}$ Generation Partnership Project) LTE (Long Term Evolution, Long Term Evolution) R10 (Release 10, Release 10) downlink system; the other type of reference signal is used to measure a channel state or channel quality, to schedule the UE, and for example, is a CSI-RS (Channel State Information-Reference Signal, channel state information-reference signal).

The UE obtains a channel quality measurement result based on the CSI-RS, to obtain channel state information CSI from the channel quality measurement result. The CSI includes a rank indicator, a precoding indication, a channel quality indicator (CQI: Channel Quality Indicator), and the like. The rank indicator reflects a quantity of space layers of a channel.

With development and use of more and higher frequency spectrums, system bandwidth dramatically increases, and it is found through channel state information measurement on ten 10 MHz subbands of a bandwidth of 100 MHz that, rank indicators of the subbands of the entire system bandwidth present subband characteristics. To be specific, the rank indicators of the subbands are not totally the same. For example, a rank of a subband 1 is 1, a rank of a subband 2 is 3, and a rank of a subband 3 is 2. Based on the subband characteristics of the rank indicators, correspondingly, codeword-to-layer mapping, link adaptation, transmission block sizes, and the like that correspond to the subbands also present the subband characteristics.

In the prior art, rank indicators in entire system bandwidth are the same. To be specific, the entire bandwidth has a common rank indicator. A sending device determines a transmission block size of each subband based on the common rank indicator of the entire bandwidth and maps, based on the common rank indicator, a code word corresponding to a transmission block of each subband to a transmission layer. However, in the foregoing high bandwidth scenario, if a transmit end still performs data transmission based on a common rank indicator of the entire bandwidth, because the common rank indicator cannot satisfy performance maximization requirements of different subbands, a data transmission effect is relatively poor, and system performance is greatly deteriorated.

A principle of the present invention lies in: that the sending device no longer performs data transmission based on the common rank indicator includes that the sending device no longer determines, based on the common rank indicator, the transmission block size corresponding to each subband nor maps the transmission block to the transmission layer based on the common rank indicator, but determines, based on a rank indicator of each subband, the transmission block size corresponding to the subband and maps, based on the rank indicator of the subband, the transmission block to the transmission layer corresponding to the subband. Quantities of transmission layers that correspond to the subbands herein are not totally the same. In this way, differential transmission processing is performed on the subbands based on the rank indicators not totally the same that are of the subbands, to satisfy maximum performance requirements, thereby improving a data transmission effect.

Figure 2:
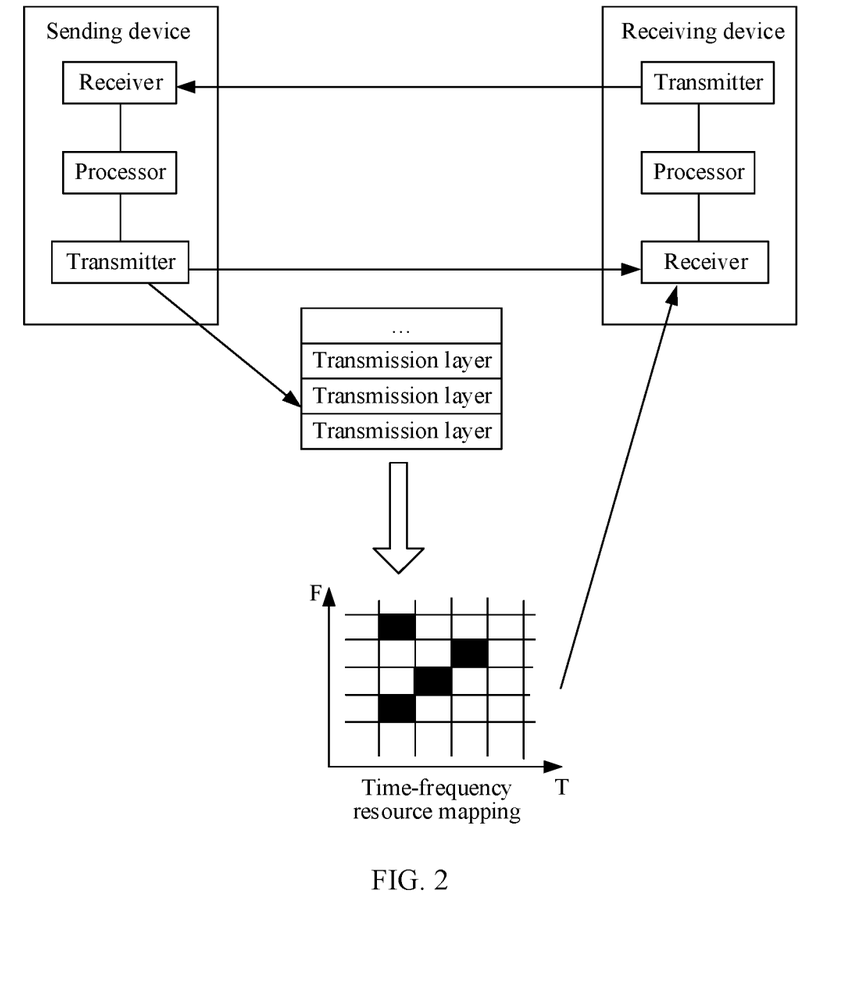
FIG. 2 is a schematic flowchart of data transmission in a communications system according to an embodiment of the present invention.

An embodiment of the present invention provides a communications system. As shown in FIG. 2, the communications system includes a sending device and a receiving device. In this embodiment of the present invention, the sending device may be a base station, and the receiving device may be a terminal. The sending device includes a transmitter, a processor, and a receiver. The receiving device includes a receiver, a processor, and a transmitter. The sending device sends data and control signaling to the receiving device by using the transmitter, and the receiving device may receive, by using the receiver of the receiving device, the control signaling and data that are sent by the sending device. The receiving device may determine a transmission layer and a time-frequency resource that correspond to the data based on the control signaling, to receive the data on the corresponding time-frequency resource. Similarly, the receiving device sends data and control signaling to the sending device by using the transmitter, and the sending device may receive, by using the receiver of the sending device, the control signaling and data that are sent by the receiving device.

Specifically, the processor may be a central processing unit (English: central processing unit, CPU for short).

A memory is configured to store program code and transmit the program code to the processor, so that the processor executes the following instruction based on the program code. The memory may include a volatile memory (volatile memory), such as a RAM (random access memory, random access memory). The memory may further include a non-volatile memory (non-volatile memory), such as a ROM (read-only memory, read-only memory), a flash memory (flash memory), an HDD (hard disk drive, hard disk drive), or an SSD (solid-state drive, solid-state drive). The memory may further include a combination of the foregoing types of memories.

The transmitter may be implemented by an optical transmitter, an electrical transmitter, a wireless transmitter, or any combination thereof. For example, the optical transmitter may be an SFP (small form-factor pluggable transceiver, small form-factor pluggable) transmitter (transceiver), an SFP+ (enhanced small form-factor pluggable, enhanced small form-factor pluggable) transmitter, or an XFP (10 Gigabit small form-factor pluggable, 10 Gigabit small form-factor pluggable) transmitter. The electrical transmitter may be a NIC (network interface controller, network interface controller) of the Ethernet (Ethernet). The wireless transmitter may be a WNIC (wireless network interface controller, wireless network interface controller).

The receiver may be implemented by an optical receiver, an electrical receiver, a wireless receiver, or any combination thereof. For example, the optical receiver may be a small form-factor pluggable receiver, an enhanced small form-factor pluggable receiver, or a 10 Gigabit small form-factor pluggable receiver. The electrical receiver may be an Ethernet network interface controller. The wireless receiver may be a wireless network interface controller.

In downlink data transmission, the sending device may be a base station or transmission point devices of other types, and the receiving device may be a terminal or other devices capable of implementing similar functions. In uplink data transmission, the sending device may be a terminal or other devices capable of implementing similar functions, and the receiving device may be a base station or transmission point devices of other types. Certainly, the sending device and the receiving device are not limited to the foregoing two devices.

The base station may be an eNB (or e-NodeB) (Evolved NodeB, evolved NodeB), a macro base station, a micro base station (also referred to as "a small cell"), a picocell base station, an AP (Access Point, access point), a TP (Transmission Point, transmission point), or the like in an LTE system or an evolved system of the LTE system, or may be a base station in a future network, such as a base station in a 5G network.

In this embodiment of the present invention, the terminal may also be referred to as user equipment (UE), or may be referred to as a terminal, an MS (Mobile Station, mobile station), a mobile terminal (Mobile Terminal), and the like. The terminal may communicate with one or more core networks by using a RAN (Radio Access Network, radio access network). For example, the terminal may be a mobile phone (also referred to as a "cellular" phone) or a computer having a mobile terminal. For example, the terminal may alternatively be a portable, pocket-sized, handheld, computer built-in, or in-vehicle mobile apparatus, which exchanges voice and/or data with the radio access network. The terminal in this embodiment of the present invention may alternatively be a D2D (Device to Device, device to device) terminal or an M2M (Machine to Machine, machine to machine) terminal.

For ease of description, the following embodiments are described mainly by using an example in which a base station is used as the sending device for downlink data transmission and a terminal is used as the receiving device for downlink data transmission. Optionally, the sending device may alternatively be a terminal, and the receiving device may alternatively be a base station. This is not limited herein.

Figure 3:
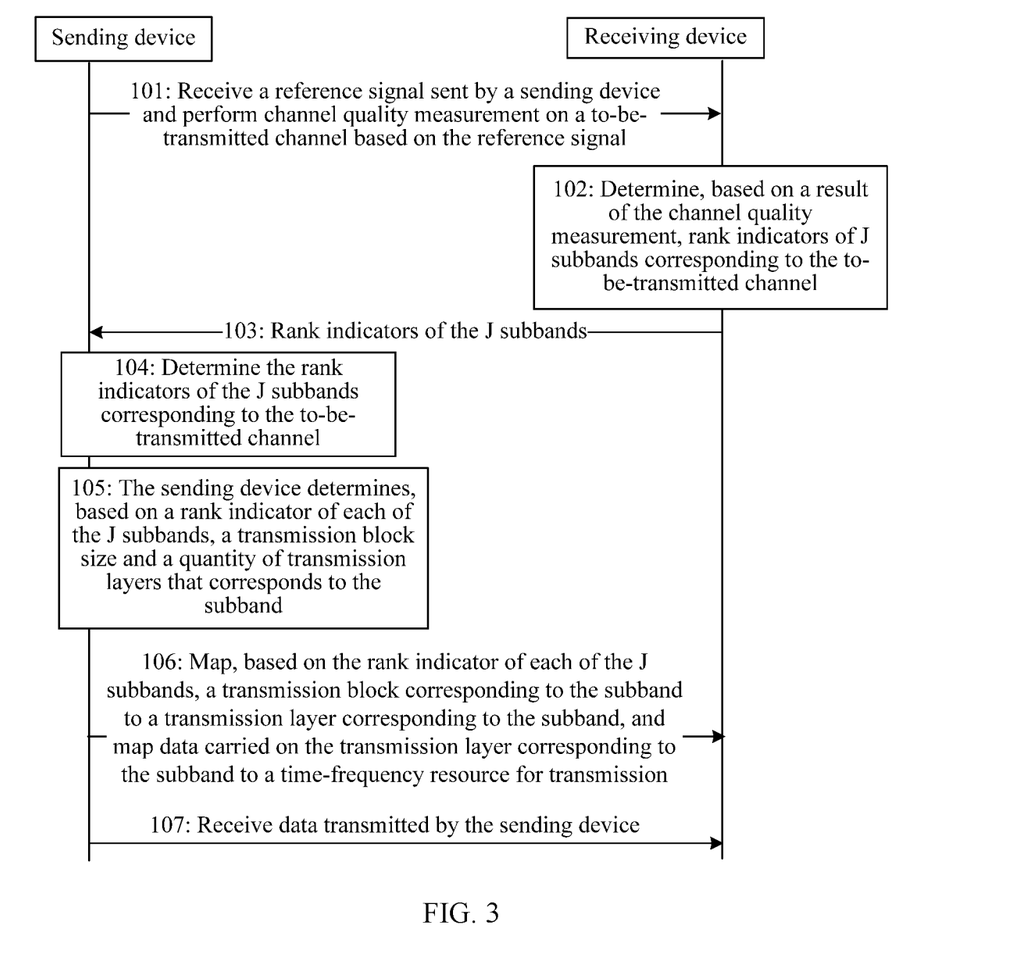
FIG. 3 is a schematic flowchart of a data transmission method according to an embodiment of the present invention.

An embodiment of the present invention provides a data transmission method. As shown in FIG. 3, the method includes the following steps.

101: A receiving device receives a reference signal sent by a sending device and performs channel quality measurement on a to-be-transmitted channel based on the reference signal.

The reference signal herein may be a CSI-RS, and a result of the channel sounding includes a rank indicator, a PMI precoding matrix indication, a CQI, and the like.

102: The receiving device determines, based on a result of the channel quality measurement, rank indicators of J subbands corresponding to the to-be-transmitted channel.

The rank indicators of the J subbands present subband characteristics, and the rank indicators of the J subbands are not totally the same. In addition, J is an integer greater than or equal to 2.

In addition, the J subbands are M physical subbands corresponding to the to-be-transmitted channel. In this case, J is equal to M. Alternatively, the J subbands include at least one group of subbands having a same rank in the M physical subbands, the group of subbands having the same rank are at least two physical subbands whose rank indicators are the same in the M physical subbands, and J is less than M. However, a quantity of subbands obtained through division is relatively great and the sending device needs to notify a quantity of layers for spatial multiplexing (that is, a rank) and a modulation and coding scheme (that is, an MCS) of each subband. Therefore, when a quantity of subbands obtained by dividing entire system bandwidth is relatively great, enormous signaling overheads are required. The subbands having the same rank are divided into a same virtual subband for same processing, so that overheads of notification signaling can be greatly reduced.

The J subbands may be J subbands predefined based on the system bandwidth. For example, there are different quantities of subbands in different system bandwidth. Usually, higher system bandwidth indicates greater J. Optionally, in another implementation, the J subbands may be J subbands notified by the base station by using higher layer signaling or physical layer control signaling. This is not limited herein.

Optionally, the M physical subbands may alternatively be M physical subbands predefined based on the system bandwidth. For example, there are different quantities of physical subbands in different system bandwidth. Usually, higher system bandwidth indicates greater M. Optionally, in another implementation, the M physical subbands may be M physical subbands notified by the base station by using higher layer signaling or physical layer control signaling. This is not limited herein.

103: The receiving device reports the rank indicators of the J subbands to the sending device.

104: The sending device determines the rank indicators of the J subbands corresponding to the to-be-transmitted channel.

Herein, the sending device may determine the rank indicators of the J subbands based on the rank indicators reported by the receiving device that are of the J subbands corresponding to the to-be-transmitted channel. Alternatively, the sending device may determine, based on channel quality measurement on a received reference signal, the rank indicators of the J subbands corresponding to the to-be-transmitted channel.

105: The sending device determines, based on a rank indicator of each of the J subbands, a transmission block size and a quantity of transmission layers that corresponds to the subband.

The transmission block size herein is a total transmission block size corresponding to the J subbands, that is, a sum of transmission block sizes corresponding to the J subbands. Alternatively, the transmission block size may be a transmission block size corresponding to each of the J subbands.

Based on the above, the sending device may determine the transmission block size in the following two manners.

Manner 1: First, a rank indicator of the $i^{th}$ (where i is an integer greater than or equal to 1 and less than or equal to J) subband in the J subbands is used as a quantity of transmission layers that corresponds to the $i^{th}$ subband; a CQI corresponding to the $i^{th}$ subband is determined based on the rank indicator of the $i^{th}$ subband, and modulation and coding information corresponding to the $i^{th}$ subband is determined based on the CQI corresponding to the $i^{th}$ subband. In addition, a transmission block size corresponding to the $i^{th}$ subband is determined based on the quantity of transmission layers that corresponds to the $i^{th}$ subband, the modulation and coding information corresponding to the $i^{th}$ subband, and a quantity of scheduling resource blocks that corresponds to the $i^{th}$ subband.

For example, a predefined transmission block size (Transmission Block Size, TBS) table may be searched based on the quantity NPRB_i of scheduling resource blocks, the modulation and coding information MCS_i, and a quantity RI_i of layers for spatial multiplexing on the $i^{th}$ subband to determine a subtransmission block size TBS (i) on the $i^{th}$ subband. In this solution, a new TBS table does not need to be designed. When a size of a subband is equal to that of system bandwidth of an LTE system, a TBS table in an existing long term evolution (Long Term Evolution, LTE) system can be completely reused. For example, if a subband has a size of 10 MHz, a TBS table corresponding to a system having a bandwidth of 10 MHz in existing LTE may be reused.

Manner 2: The transmission block size corresponding to the J subbands is determined based on the transmission block size corresponding to each of the J subbands. For example, the transmission block size corresponding to the J subbands may be the sum of the transmission block sizes corresponding to the subbands.

For example, the transmission block size TBS=TBS (1)+ TBS (i)+ . . . +TBS (J), where a value of i is any one of positive integers greater than or equal to 1 and less than or equal to J.

Certainly, the transmission block size corresponding to each subband may be determined based on the foregoing method. Details are not described herein.

106: The sending device maps, based on the rank indicator of each of the J subbands, a transmission block corresponding to the subband to a transmission layer corresponding to the subband, and maps data carried on the transmission layer corresponding to the subband to a time-frequency resource for transmission.

First, a code word corresponding to a transmission block corresponding to the $i^{th}$ subband is mapped, based on the quantity of transmission layers that corresponds to the $i^{th}$ subband, a common quantity of code words of the J subbands, and a predefined code-word-to-layer mapping relationship, to a transmission layer corresponding to the subband. The common quantity of code words herein is the common quantity of code words of the J subbands. To be specific, the subbands share a same quantity of code words.

Specifically, refer to a mapping table shown in Table 1 to determine a code word mapping formula.

TABLE 1

| Quantity of transmission layers | Quantity of code words | Code word mapping formula $i = 0, 1, \ldots, M_{symb}^{layer} - 1$ |
|---|---|---|
| 1 | 1 | $x^{(0)}(i) = d^{(0)}(i)$, and $M_{symb}^{layer} = M_{symb}^{(0)}$ |
| 2 | 1 | $x^{(0)}(i) = d^{(0)}(2i)$, $x^{(1)}(i) = d^{(0)}(2i + 1)$, and $M_{symb}^{layer} = M_{symb}^{(0)}/2$ |
| 2 | 2 | $x^{(0)}(i) = d^{(0)}(i)$, $x^{(1)}(i) = d^{(1)}(i)$, and $M_{symb}^{layer} = M_{symb}^{(0)} = M_{symb}^{(1)}$ |
| 3 | 1 | $x^{(0)}(i) = d^{(0)}(3i)$, $x^{(1)}(i) = d^{(0)}(3i + 1)$, $x^{(2)}(i) = d^{(0)}(3i + 2)$, and $M_{symb}^{layer} = M_{symb}^{(0)}/3$ |
| 3 | 2 | $x^{(0)}(i) = d^{(0)}(i)$, $x^{(1)}(i) = d^{(1)}(2i)$, $x^{(2)}(i) = d^{(1)}(2i + 1)$, and $M_{symb}^{layer} = M_{symb}^{(0)} = M_{symb}^{(0)/2}$ |
| 4 | 1 | $x^{(0)}(i) = d^{(0)}(4i)$, $x^{(1)}(i) = d^{(0)}(4i + 1)$, $x^{(2)}(i) = d^{(0)}(4i + 2)$, $x^{(3)}(i) = d^{(0)}(4i + 3)$, and $M_{symb}^{layer} = M_{symb}^{(0)}/3$ |
| 4 | 2 | $x^{(0)}(i) = d^{(0)}(2i)$, $x^{(1)}(i) = d^{(0)}(2i + 1)$, $x^{(2)}(i) = d^{(1)}(2i)$, $x^{(3)}(i) = d^{(1)}(2i + 1)$, and $M_{symb}^{layer} = M_{symb}^{(0)}/2 = M_{symb}^{(1)}/2$ |

For example, the subbands of entire bandwidth have the common quantity of code words. Under assumption of the common quantity of code words, Table 1 is searched based on quantities of transmission layers (that is, the rank indicators) of the subbands for code-word-to-layer mapping. If the common quantity of code words of the subbands is 2, a rank indicator of a subband 1 is 2, and a rank indicator of a subband 2 is 3, a code word mapping formula of the subband 1 is $x^{(0)}(i)=d^{(0)}(i)$, $x^{(1)}(i)=d^{(1)}(i)$, and $M_{symb}^{layer}=M_{symb}^{(0)}=M_{symb}^{(1)}$ in Table 1, and a code word mapping formula of the subband 2 is $x^{(0)}(i)=d^{(0)}(i)$, $x^{(1)}(i)=d^{(1)}(2i)$, $x^{(2)}(i)=d^{(1)}(2i+1)$, and $M_{symb}^{layer}=M_{symb}^{(0)}=M_{symb}^{(0)}/2$ in Table 1.

Second, a code word corresponding to a transmission block corresponding to the $i^{th}$ subband is mapped, based on the quantity of transmission layers that corresponds to the $i^{th}$ subband, a quantity of code words of the $i^{th}$ subband, and a predefined code-word-to-layer mapping relationship, to a transmission layer corresponding to the $i^{th}$ subband. In this case, quantities of code words of the J subbands are not totally the same.

In a specific implementation, the subbands of entire bandwidth have respective quantities of code words. Table 1 is searched based on the quantities of code words and quantities of transmission layers (that is, the rank indicators) of the subbands for code-word-to-layer mapping. For example, if a quantity of code words of a virtual subband 1 is 1 and a rank indicator is 2, and a quantity of code words of a virtual subband 2 is 2 and a rank indicator is 3, a code word mapping formula of the virtual subband 1 is $x^{(0)}(i)=d^{(0)}(2i)$, $x^{(1)}(i)=d^{(0)}(2i+1)$, and $M_{symb}^{layer}=M_{symb}^{(0)}/2$ and a code word mapping formula of the virtual subband 2 is $x^{(0)}(i)=d^{(0)}(i)$, $x^{(1)}(i)=d^{(1)}(2i)$, $x^{(2)}(i)=d^{(1)}(2i+1)$, and $M_{symb}^{layer}=M_{symb}^{(0)}=M_{symb}^{(0)}/2$.

Usually, a symbol stream (the data carried on the transmission layer) for modulation and coding needs to be mapped to the time-frequency resource for transmission. When different virtual subbands or subbands use different modulation and coding schemes, mapping of corresponding symbol streams is also different. An order of mapping to-be-transmitted symbol streams carried on the transmission layers corresponding to the subbands to resource units is first in an order of the subbands in frequency domain and then in an order of first frequency domain and then time domain. To be specific, a symbol stream corresponding to a first subband is mapped on a time-frequency resource corresponding to the first subband in an order of first frequency domain and then time domain, and then a symbol stream corresponding to a second subband is mapped on a time-frequency resource corresponding to the second subband in an order of first frequency domain and then time domain. Herein, the subband 1 and the subband 2 are two subbands that have an order in frequency domain, and the subband 1 is prior to the subband 2 in frequency domain.

Certainly, alternatively, the data carried on the transmission layer may be mapped to the time-frequency resource in an order of first time domain and then frequency domain. Alternatively, the data may be mapped in any other mapping manner. This is not specifically limited herein.

107: The receiving device receives data transmitted by the sending device.

In a specific implementation, the transmission layer corresponding to each of the J subbands is determined based on the rank indicator of each of the J subbands, and the time-frequency resource to which the transmission layer corresponding to the subband is mapped is determined based on the rank indicator of each of the J subbands; the data transmitted by the sending device is received on the time-frequency resource to which the transmission layer corresponding to the subband is mapped.

In a embodiment of the present invention, the sending device further sends first control information indication signaling. The first control information indication signaling is used to indicate at least one of rank information, precoding matrix information, and modulation and coding information. The rank information includes the rank indicator of each of the J subbands, the precoding matrix information includes precoding matrix information of each of the J subbands, and the modulation and coding information includes modulation and coding information of each of the J subbands. The rank indicators of the J subbands in the signaling use a differential manner; and/or the precoding matrix information of the J subbands uses a differential manner; and/or the modulation and coding information of the J subbands uses a differential manner.

Alternatively, the sending device sends second control information indication signaling, where the second control information indication signaling is used to indicate at least one of a common rank indicator of the J subbands, the precoding matrix information of the J subbands, and common modulation and coding information of the J subbands. The precoding matrix information of the J subbands may be common precoding matrix information of the J subbands or may be precoding matrix information of each of the J subbands. Specifically, the rank information may include the rank indicator, for example, a rank indicator index (Rank Indicator, RI). The precoding matrix information may include a precoding matrix indication, for example, a precoding matrix indication index (Precoding Matrix Indication, PMI). The modulation and coding information may include a modulation and coding scheme, for example, a modulation and coding scheme index (Modulation Coding Scheme, MCS).

Optionally, in another possible implementation, the second control information indication signaling is used to indicate at least one of a common rank indicator of K subbands, precoding matrix information of the K subbands, and common modulation and coding information of the K subbands. K is a positive integer less than or equal to M. When K is less than M, the K subbands share common rank information, common precoding matrix information, and the common modulation and coding information, thereby reducing feedback overheads of control signaling. Rank information, precoding matrix information, and modulation and coding information of remaining M-K subbands are sent to the receiving device by using the first control information indication signaling.

It should be noted that the rank indicator of the subband that is used by the receiving device to determine, before receiving the data transmitted by the sending device, the transmission layer corresponding to the subband may be the rank indicator of each subband that is carried in the first control information indication signaling or may be the common rank indicator of the J subbands that is carried in the second control information indication signaling.

When the rank indicators of the subbands present subband characteristics, signaling needs to be sent to independently notify rank indicator information, precoding matrix information, or modulation and coding information of each subband. A quantity of required downlink control information (Downlink Control Information, DCI) signaling bits multiplies with a quantity of subbands.

In the prior art, common rank indicator information and/or precoding matrix information of the entire bandwidth and/or common modulation and coding information of the entire bandwidth may be transmitted in a DCI format 2 or 2C, or the like. If specific control information of all newly added subbands is placed in an existing DCI format, enormous signaling overheads are required.

Therefore, specific rank indicator information and/or precoding matrix information and/or modulation and coding information of a plurality of subbands may be multiplexed in a new control information indication format. To be specific, at least one of the rank indicator information and/or the precoding matrix information and/or the modulation and coding information of the plurality of subbands is carried in a same control information indication format. In a specific implementation, a new DCI format, for example, a DCI format 5 or 5A, specifically used for multiplexing the indication information of the plurality of subbands may be defined. This design does not increase a size of an existing DCI format (such as a DCI format 2C). In addition, this design may be adaptively triggered according to scenarios and requirements. For example, sending in the DCI format 5 or 5A is triggered only when there is a requirement that different subbands have different rank indicators and/or different modulation and coding schemes and/or different precoding matrix information in a high bandwidth scenario.

Optionally, information bit domains of the rank indicator, the MCS, and a TPMI of each subband include:

layer quantity indication information of three bits;

a modulation and coding scheme indicator of five bits; and precoding matrix indication information of two or four bits.

In addition, indication of the indication information in a DCI signaling format corresponding to rank indicators, precoding matrix information, and modulation and coding information (such as an MCS) of a plurality of subbands in the first control information indication signaling may use a differential manner. Using the MCS as an example, K MCSs use an indication manner of a common MCS plus differential MCSs in the first control information indication signaling. The common MCS herein is a same MCS shared by a plurality of subbands corresponding to the to-be-transmitted channel. A plurality of differential MCSs are differential values between MCSs of remaining subbands corresponding to the to-be-transmitted channel and the common MCS.

In the data transmission method provided in the present invention, that the sending device no longer performs data transmission based on the common rank indicator includes that the sending device no longer determines, based on the common rank indicator, the transmission block size corresponding to each subband, but determines, based on the rank indicator of each subband, the transmission block size corresponding to the subband and maps, based on the rank indicator of the subband, the transmission block to the transmission layer corresponding to the subband. The quantities of transmission layers that correspond to the subbands herein are not totally the same. In this way, differential transmission processing is performed on the subbands based on the rank indicators not totally the same that are of the subbands, to maximally satisfy requirements of different subbands, thereby improving performance of data transmission in the high bandwidth scenario.

The solutions provided in the embodiments of the present invention are described above mainly from perspectives of working processes of the sending device and the receiving device. It can be understood that to achieve the foregoing functions, the sending device and the receiving device include corresponding hardware structures and/or software modules for executing various functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, function modules of the sending device and the receiving device may be divided based on the foregoing method examples. For example, various function modules may be divided correspondingly to various functions, or two or more functions may be integrated in a processing module. The integrated module may be implemented in a form of hardware, or may be implemented in a form of a software functional module. It should be noted that the module division in the embodiments of the present invention is an example, and is merely logical function division. There may be other division manners in an actual implementation.

Figure 4:
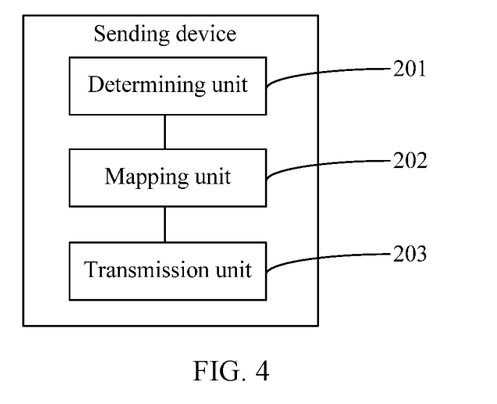
FIG. 4 is a structural block diagram of a sending device according to an embodiment of the present invention.

When function modules are divided corresponding to various functions, FIG. 4 is a possible schematic structural diagram of the sending device in the foregoing embodiment. The sending device includes a determining unit 201, a mapping unit 202, and a transmission unit 203. The determining unit 201 is configured to support the sending device in performing processes 104 and 105 in FIG. 3. The mapping unit 202 is configured to support the sending device in performing resource mapping in process 106 in FIG. 3. The transmission unit 203 is configured to support the sending device in performing data transmission in process 106 in FIG. 3. All related content of the steps in the foregoing method embodiments may be quoted to function descriptions of the corresponding function modules. Details are not described herein again.

Figure 5:
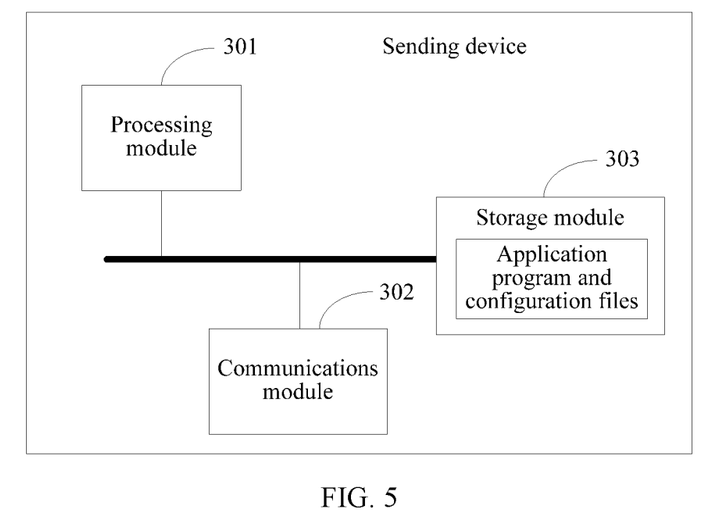
FIG. 5 is another structural block diagram of a sending device according to an embodiment of the present invention.

When an integrated unit is used, FIG. 5 is a possible schematic structural diagram of the sending device in the foregoing embodiment. The sending device may include a processing module 301, a communications module 302, and a storage module 303. The processing module 301 is configured to control and manage actions of the sending device. For example, the processing module 301 is configured to support the sending device in performing processes 104 and 105 in FIG. 3 and/or other processes of a technology described in this specification. The communications module 302 is configured to support a sending device to communicate with other network entities, for example, perform process 106 in FIG. 3. The storage module 303 is configured to store program code and data of the storage device.

The processing module 301 may be a processor in a physical structure of the sending device shown in FIG. 2, may be a processor or a controller, and for example, may be a CPU, a general purpose processor, a DSP, an ASIC, an FPGA or another programmable logic device, a transistor logic device, a hardware component, or any combination thereof. The processing module 301 may implement or execute various examples of logical blocks, modules, and circuits described with reference to content disclosed in the present invention. Alternatively, the processor may be a combination of processors implementing a computing function, for example, a combination of one or more microprocessors, or a combination of a DSP and a microprocessor. The communications module 302 may be a network interface, that is, a transmitter and a receiver, in the physical structure of the sending device shown in FIG. 2. The communications module 302 may be a communications port, or may be a transceiver, a transceiver circuit, a communications interface, or the like. The storage module 303 may be a memory in the physical structure of the sending device shown in FIG. 2.

Figure 6:
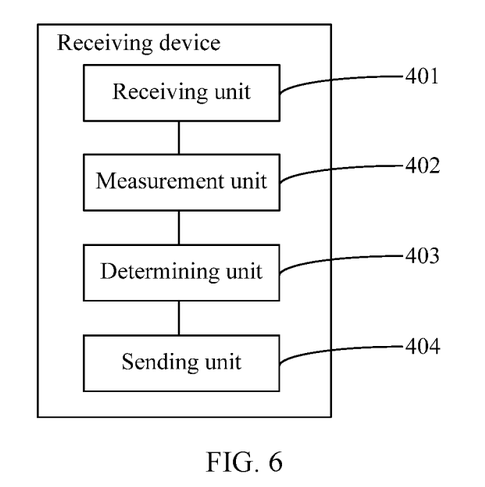
FIG. 6 is a structural block diagram of a receiving device according to an embodiment of the present invention.

When function modules are divided corresponding to various functions, FIG. 6 is a possible schematic structural diagram of the receiving device in the foregoing embodiment. The receiving device includes a receiving unit 401, a measurement unit 402, a determining unit 403, and a sending unit 404. The receiving unit 401 is configured to support the receiving device in performing process 101 in FIG. 3. The measurement unit 402 is configured to support the receiving device in performing channel sounding in process 101 in FIG. 3. The determining unit 403 is configured to support the receiving device in performing data transmission in process 102 in FIG. 3. The sending unit 404 is configured to support the receiving device in performing process 103 in FIG. 3. All related content of the steps in the foregoing method embodiments may be quoted to function descriptions of the corresponding function modules. Details are not described herein again.

Figure 7:
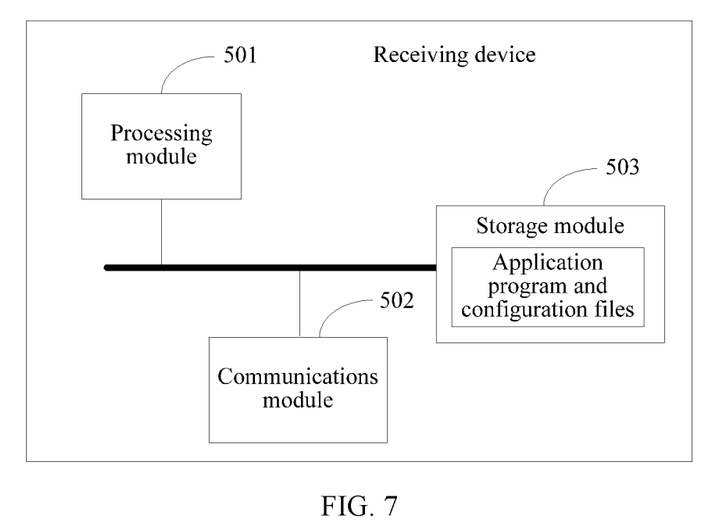
FIG. 7 is another structural block diagram of a receiving device according to an embodiment of the present invention.

When an integrated unit is used, FIG. 7 is a possible schematic structural diagram of the receiving device in the foregoing embodiment. The receiving device may include a processing module 501, a communications module 502, and a storage module 503. The processing module 501 is configured to control and manage actions of the receiving device. For example, the processing module 501 is configured to support the receiving device in performing process 102 in FIG. 3 and/or other processes of a technology described in this specification. The communications module 502 is configured to support a storage device to communicate with other network entities, for example, perform process 103 in FIG. 3. The storage module 503 is configured to store program code and data of the storage device.

The processing module 501 may be a processor in a physical structure of the receiving device shown in FIG. 2, may be a processor or a controller, and for example, may be a CPU, a general purpose processor, a DSP, an ASIC, an FPGA or another programmable logic device, a transistor logic device, a hardware component, or any combination thereof. The processing module 501 may implement or execute various examples of logical blocks, modules, and circuits described with reference to content disclosed in the present invention. Alternatively, the processor may be a combination of processors implementing a computing function, for example, a combination of one or more microprocessors, or a combination of a DSP and a microprocessor. The communications module 502 may be a network interface, that is, a transmitter and a receiver, in the physical structure of the receiving device shown in FIG. 2. The communications module 502 may be a communications port, or may be a transceiver, a transceiver circuit, a communications interface, or the like. The storage module 503 may be a memory in the physical structure of the receiving device shown in FIG. 2.

The foregoing descriptions about implementations allow a person skilled in the art to clearly understand that, for the purpose of convenient and brief description, division of the foregoing function modules is taken as an example for illustration. In actual application, the foregoing functions can be allocated to different modules for implementation according to requirements. To be specific, an inner structure of an apparatus is divided into different function modules to implement all or some of the functions described above. For a detailed working process of the foregoing apparatus, refer to a corresponding process in the foregoing method embodiments, and details are not described herein again.

The modules described as separate components may be or may not be physically separated. Components displayed as modules may be one physical module or a plurality of physical modules, that is, may be located at one location or may be distributed at a plurality of different locations. Some or all the modules may be selected according to actual requirements to achieve the objectives of the solutions of the embodiments. In addition, functional modules in the embodiments of the present invention may be integrated into one processing module, or each of the modules may exist alone physically, or two or more modules are integrated into one module. The integrated module may be implemented in a form of hardware, or may be implemented in a form of a software functional module.

If the integrated module is implemented in a form of a software function unit and sold or used as an independent product, the module may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or a compact disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of data transmission, comprising:
   determining, by a sending device, rank indicators of J subbands corresponding to a to-be-transmitted channel, wherein at least one of the rank indicators of the J subbands is different than at least another of the rank indicators of the J subbands, and J is an integer greater than or equal to 2;
   determining, by the sending device based on a rank indicator of each of the J subbands, a transmission block size and a quantity of transmission layers that corresponds to the subband, wherein the transmission block size is a transmission block size corresponding to the J subbands or a transmission block size corresponding to each of the J subbands, wherein when the transmission block size is the transmission block size corresponding to each of the J subbands, the determining, by the sending device based on a rank indicator of each of the J subbands, a transmission block size and a quantity of transmission layers that corresponds to the subband comprises:
      using a rank indicator of an $i^{th}$ subband in the J subbands as a quantity of transmission layers that corresponds to the $i^{th}$ subband, wherein i is an integer greater than or equal to 1 and less than or equal to J;
      determining, based on the rank indicator of the $i^{th}$ subband, a channel quality indicator CQI corresponding to the $i^{th}$ subband, and determining, based on the CQI corresponding to the $i^{th}$ subband, modulation and coding information corresponding to the $i^{th}$ subband; and
      determining, based on the quantity of transmission layers that corresponds to the $i^{th}$ subband, the modulation and coding information corresponding to the $i^{th}$ subband, and a quantity of scheduling resource blocks that corresponds to the $i^{th}$ subband, a transmission block size corresponding to the $i^{th}$ subband;
   mapping, by the sending device based on the rank indicator of each of the J subbands, a transmission block corresponding to the subband to a transmission layer corresponding to the subband; and
   mapping, by the sending device, data carried on the transmission layer corresponding to the subband to a time-frequency resource for transmission.

2. The method according to claim 1, wherein the method further comprises:
   sending, by the sending device, first control information indication signaling used to indicate at least one of rank information, precoding matrix information, and modulation and coding information, the rank information comprises the rank indicator of each of the J subbands, the precoding matrix information comprises precoding matrix information of each of the J subbands, and the modulation and coding information comprises modulation and coding information of each of the J subbands.

3. The method according to claim 1, wherein the J subbands are M physical subbands corresponding to the to-be-transmitted channel, and J is equal to M; or the J subbands include at least one group of subbands having a same rank in the M physical subbands, the group of subbands having the same rank are at least two physical subbands whose rank indicators are the same in the M physical subbands, and J is less than M.

4. The method according to claim 1, wherein when the transmission block size is the transmission block size corresponding to the J subbands, the determining, by the sending device based on a rank indicator of each of the J subbands, a transmission block size and a quantity of transmission layers that corresponds to the subband comprises:

using the rank indicator of the $i^{th}$ subband in the J subbands as the quantity of transmission layers that corresponds to the $i^{th}$ subband, wherein i is an integer greater than or equal to 1 and less than or equal to J; and determining, based on the transmission block size corresponding to each of the J subbands, the transmission block size corresponding to the J subbands.

5. The method according to claim 1, wherein the mapping, by the sending device based on the rank indicator of each of the J subbands, a transmission block corresponding to the subband to a transmission layer corresponding to the subband comprises:

mapping, based on the quantity of transmission layers that corresponds to the $i^{th}$ subband and a common quantity of code words of the J subbands, a code word corresponding to a transmission block corresponding to the $i^{th}$ subband to a transmission layer corresponding to the $i^{th}$ subband, wherein the common quantity of code words is the common quantity of code words of the J subbands; or mapping, based on the quantity of transmission layers that corresponds to the $i^{th}$ subband and a quantity of code words of the $i^{th}$ subband, a code word corresponding to a transmission block corresponding to the $i^{th}$ subband to a transmission layer corresponding to the $i^{th}$ subband, wherein quantities of code words of the J subbands are not totally the same.

6. The method according to claim 1, wherein the mapping data carried on the transmission layer corresponding to the subband to a time-frequency resource for transmission comprises:

mapping, in an order of first frequency domain and then time domain, the data carried on the transmission layer corresponding to the subband.

7. The method according to claim 2, wherein the rank indicators of the J subbands in the first control information indication signaling use a differential manner; and/or the precoding matrix information of the J subbands uses a differential manner; and/or the modulation and coding information of the J subbands uses a differential manner.

8. The method according to claim 1, wherein the method further comprises:

sending, by the sending device, second control information indication signaling, wherein the second control information indication signaling is used to indicate at least one of a common rank indicator of the J subbands, the precoding matrix information of the J subbands, and common modulation and coding information of the J subbands.

9. The method according to claim 1, wherein the determining, by a sending device, rank indicators of J subbands corresponding to a to-be-transmitted channel comprises:

determining, by the sending device based on channel quality measurement on a received reference signal, the rank indicators of the J subbands corresponding to the to-be-transmitted channel; or receiving the rank indicators reported by the receiving device that are of the J subbands corresponding to the to-be-transmitted channel.

10. A sending device, comprising:

a processor, configured to:

determine rank indicators of J subbands corresponding to a to-be-transmitted channel, wherein at least one of the rank indicators of the J subbands is different than at least another of the rank indicators of the J subbands, and J is an integer greater than or equal to 2;

determine, based on a rank indicator of each of the J subbands, a transmission block size and a quantity of transmission layers that corresponds to the subband, wherein the transmission block size is a transmission block size corresponding to the J subbands or a transmission block size corresponding to each of the J subbands, wherein when the transmission block size is the transmission block size corresponding to each of the J subbands, the processor is configured to:

use a rank indicator of an $i^{th}$ subband in the J subbands as a quantity of transmission layers that corresponds to the $i^{th}$ subband, wherein i is an integer greater than or equal to 1 and less than or equal to J; and determine, based on the rank indicator of the $i^{th}$ subband, a channel quality indicator CQI corresponding to the $i^{th}$ subband, and determine, based on the CQI corresponding to the $i^{th}$ subband, modulation and coding information corresponding to the $i^{th}$ subband; and determine, based on the quantity of transmission layers that corresponds to the $i^{th}$ subband, the modulation and coding information corresponding to the $i^{th}$ subband, and a quantity of scheduling resource blocks that corresponds to the $i^{th}$ subband, a transmission block size corresponding to the $i^{th}$ subband; and map, based on the rank indicator of each of the J subbands, a transmission block corresponding to the subband to a transmission layer corresponding to the subband; and a transmitter, configured to map data carried on the transmission layer corresponding to the subband to a time-frequency resource for transmission.

11. The sending device according to claim 10, wherein the transmitter is further configured to:

send first control information indication signaling, wherein the first control information indication signaling is used to indicate at least one of rank information, precoding matrix information, and modulation and coding information, the rank information comprises the rank indicator of each of the J subbands, the precoding matrix information comprises precoding matrix information of each of the J subbands, and the modulation and coding information comprises modulation and coding information of each of the J subbands.

12. The sending device according to claim 10, wherein the J subbands are M physical subbands corresponding to the to-be-transmitted channel, and J is equal to M; or
the J subbands include at least one group of subbands having a same rank in the M physical subbands, the group of subbands having the same rank are at least two physical subbands whose rank indicators are the same in the M physical subbands, and J is less than M.

13. The sending device according to claim 10, wherein when the transmission block size is the transmission block size corresponding to the J subbands, the processor is configured to: use the rank indicator of the subband in the J subbands as the quantity of transmission layers that corresponds to the $i^{th}$ subband, wherein i is an integer greater than or equal to 1 and less than or equal to J; and
determine, based on the transmission block size corresponding to each of the J subbands, the transmission block size corresponding to the J subbands.

14. The sending device according to claim 10, wherein the processor is configured to: map, based on the quantity of transmission layers that corresponds to the $i^{th}$ subband and a common quantity of code words of the J subbands, a code word corresponding to a transmission block corresponding to the $i^{th}$ subband to a transmission layer corresponding to the $i^{th}$ subband, wherein the common quantity of code words is the common quantity of code words of the J subbands; or
map, based on the quantity of transmission layers that corresponds to the itn subband and a quantity of code words of the $i^{th}$ subband, a code word corresponding to a transmission block corresponding to the $i^{th}$ subband to a transmission layer corresponding to the $i^{th}$ subband, wherein quantities of code words of the J subbands are not totally the same.

15. The sending device according to claim 10, wherein the transmitter is configured to map, in an order of first frequency domain and then time domain, the data carried on the transmission layer corresponding to the subband.

16. The sending device according to claim 11, wherein the rank indicators of the J subbands in the first control information indication signaling use a differential manner; and/or
the precoding matrix information of the J subbands uses a differential manner; and/or
the modulation and coding information of the J subbands uses a differential manner.

17. The sending device according to claim 10, wherein the transmitter is further configured to send second control information indication signaling, wherein the second control information indication signaling is used to indicate at least one of a common rank indicator of the J subbands, the precoding matrix information of the J subbands, and common modulation and coding information of the J subbands.

18. The sending device according to claim 10, further comprising a receiver configured to receive a reference signal and to perform channel quality measurement on the to-be-transmitted channel based on the reference signal; and
the processor is further configured to determine, based on a result of the channel quality measurement, the rank indicators of the J subbands corresponding to the to-be-transmitted channel; or
the receiver is configured to receive the rank indicators reported by the receiving device that are of the J subbands corresponding to the to-be-transmitted channel.

\* \* \* \* \*

UNITED STATES PATENT AND TRADEMARK OFFICE
CERTIFICATE OF CORRECTION

PATENT NO. : 10,862,557 B2
APPLICATION NO. : 16/273680
DATED : December 8, 2020
INVENTOR(S) : Liu It is certified that error appears in the above-identified patent and that said Letters Patent is hereby corrected as shown below:

In the Claims

Claim 13: Column 25, Line 12:
"configured to: use the rank indicator of the subband in the J"
Should read:
-- configured to: use the rank indicator of the $i^{th}$ subband in the J --.

Claim 14: Column 25, Line 27:
"corresponds to the itn subband and a quantity of code"
Should read:
-- corresponds to the $i^{th}$ subband and a quantity of code --.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*